(12) United States Patent
Lucidarme et al.

(10) Patent No.: US 6,615,035 B1
(45) Date of Patent: Sep. 2, 2003

(54) PUBLIC MOBILE COMMUNICATION SYSTEM COMPATIBLE WIRELESS COMMUNICATION SYSTEM

(75) Inventors: Thierry Lucidarme, Montigny le Bretonneux (FR); Paul Vincent, Rueil Malmaison (FR); Philippe Duplessis, Colombes (FR)

(73) Assignee: Nortel Matra Cellular (FR)

( * ) Notice: Subject to any disclaimer, the term of this patent is extended or adjusted under 35 U.S.C. 154(b) by 0 days.

(21) Appl. No.: 09/555,324

(22) PCT Filed: Nov. 20, 1998

(86) PCT No.: PCT/FR98/02490
§ 371 (c)(1),
(2), (4) Date: Sep. 20, 2000

(87) PCT Pub. No.: WO99/27729
PCT Pub. Date: Jun. 3, 1999

(30) Foreign Application Priority Data

Nov. 24, 1997 (FR) .............................. 97 14717

(51) Int. Cl.[7] .......................... H04M 1/66; H04M 1/68; H04M 3/16
(52) U.S. Cl. ........................ 455/411; 455/552; 455/558
(58) Field of Search .................................. 455/410, 411, 455/432, 462, 465, 552, 553, 422, 558

(56) References Cited

U.S. PATENT DOCUMENTS 5,535,259 A * 7/1996 Dent et al. ................... 455/452
5,778,322 A * 7/1998 Rydbeck ...................... 455/558
5,933,785 A * 8/1999 Tayloe ......................... 455/558
6,195,531 B1 * 2/2001 Aguirre et al. ............. 455/11.1
6,314,299 B1 * 11/2001 Schreib et al. .............. 455/465
2001/0046850 A1 * 11/2001 Blanke et al. ............... 455/411

FOREIGN PATENT DOCUMENTS

| DE | 197 08 189 | 9/1998 |
| GB | 2 309 357 | 7/1997 |
| WO | WO95/02927 | 1/1995 |
| WO | WO98/28929 | 7/1998 |
| WO | WO98/38826 | 9/1998 |

* cited by examiner

Primary Examiner—Nguyen T. Vo
(74) Attorney, Agent, or Firm—Piper Rudnick

(57) ABSTRACT

The equipment has a wire interface for connection to a wire-Line telecommunication network and an air interface to communicate with mobile stations in accordance with a cellular network operating mode. Each mobile station operates in conjunction with a plug-in subscriber identity module containing parameters used to set up and/or manage the calls. The equipment also has a data reader/recorder suitable for receiving a subscriber module, reading certain parameters from it and writing to it other parameters dependent on the equipment. Telephone calls using a mobile station in conjunction with a subscriber identity module previously inserted in the reader/recorder may then be set up via the wire-line network.

19 Claims, 2 Drawing Sheets

PUBLIC MOBILE COMMUNICATION SYSTEM COMPATIBLE WIRELESS COMMUNICATION SYSTEM

BACKGROUND OF THE INVENTION

The present invention relates to a telephone equipment of the cellular radiotelephone base station type.

The operator of a mobile telephone network distributes the base stations of the network across the territory to be covered, whereby the areas covered by the base stations define the cells. These base stations are linked to other mobile service infrastructures designed to route calls and link up with the wire-line networks.

Certain subscribers to the cellular network may have a wireless telephone station in their home or generally in a private place, similar to a private base station, directly connected to a wire-line telecommunication network. When the mobile station is communicating from the subscriber's home, it accesses this private base station in preference to those of the cellular network. The call is therefore routed via the wire-line network and not via the cellular network. As a result of these arrangements, the subscriber can substitute his mobile handset for the wire-line terminal conventionally used at home.

An object of the present invention is to facilitate the use and installation of such private base stations.

SUMMARY OF THE INVENTION

Accordingly, the invention proposes a telephone equipment comprising a wire interface for connection to a wire-line telecommunication network and an air interface for communicating by radio with mobile stations in accordance with an operating mode of one type of cellular network, each mobile station operating in conjunction with a plug-in subscriber identity module containing parameters specific to the subscriber holding the mobile station and used to set up and/or operate radio calls. The equipment further comprises a data reader/recorder capable of receiving a subscriber identity module, reading therefrom at least one of the parameters specific to the subscriber and writing thereto other parameters dependent on the equipment, whereby telephone calls involving a mobile station located within range of the equipment and associated with an identity module that was previously inserted in the data reader/recorder can be set up via the wire-line network by means of the wire interface and the air interface.

The data reader/recorder enables the exchange, between the subscriber identity module and the private base station telephone equipment, of the parameters needed for the interaction of the base station and the mobile stations, i.e. on the one hand the parameters which allow the mobile station to identify the equipment as it is detected by radio and then take the required steps with the cellular network and, on the other hand, the parameters which enable the equipment to route incoming calls to the mobile station.

Use of this private station is not reserved for a single subscriber. A subscriber other than the one holding this equipment may register with this equipment by presenting his subscriber identity module to it. It is also conceivable for several subscriber modules to be registered simultaneously in order to be able to communicate via the equipment.

Another advantage is that the equipment may be issued to the user independently of the mobile station, which he may have acquired previously, in which case the reader/recorder merely has to read and re-programme the subscriber module presented to it.

Another aspect of the present invention relates to a telephone equipment of the private base station type comprising a wire interface for connection to a wire-line telecommunication network and an air interface for communicating by radio with mobile stations in accordance with an operating mode of one type of cellular network, wherein telephone communications involving a mobile station located within radio range of the equipment may be set up via the wire-line network using the wire interface and the air interface, and wherein the air interface is arranged to transmit a beacon signal in accordance with the operating mode of the type of cellular network, so that it can be detected by a mobile station located within radio range of the equipment and to cease transmitting the beacon signal during a call set up via the wire-line network and involving a mobile station. This equipment preferably incorporates the data reader/recorder defined above.

This equipment has the advantage of limiting the radio interference which it causes in the cellular network and/or other equipment of the same type. One simple solution is to arrange the air interface so that it occupies the physical channel of the beacon signal during said call involving the mobile station.

However, if several mobile stations are likely to communicate via the private base station (for example because their subscriber modules were successively submitted to the reader/recorder), the fact that one of them is making a call will cause the beacon signal to be interrupted and the equipment will no longer be detected by the other mobile station or stations. They will then locate on the cellular network so that they will still be capable of transmitting or receiving calls in spite of the fact that the line to which the equipment is connected is engaged.

DESCRIPTION OF PREFERRED EMBODIMENTS

Figure 1:
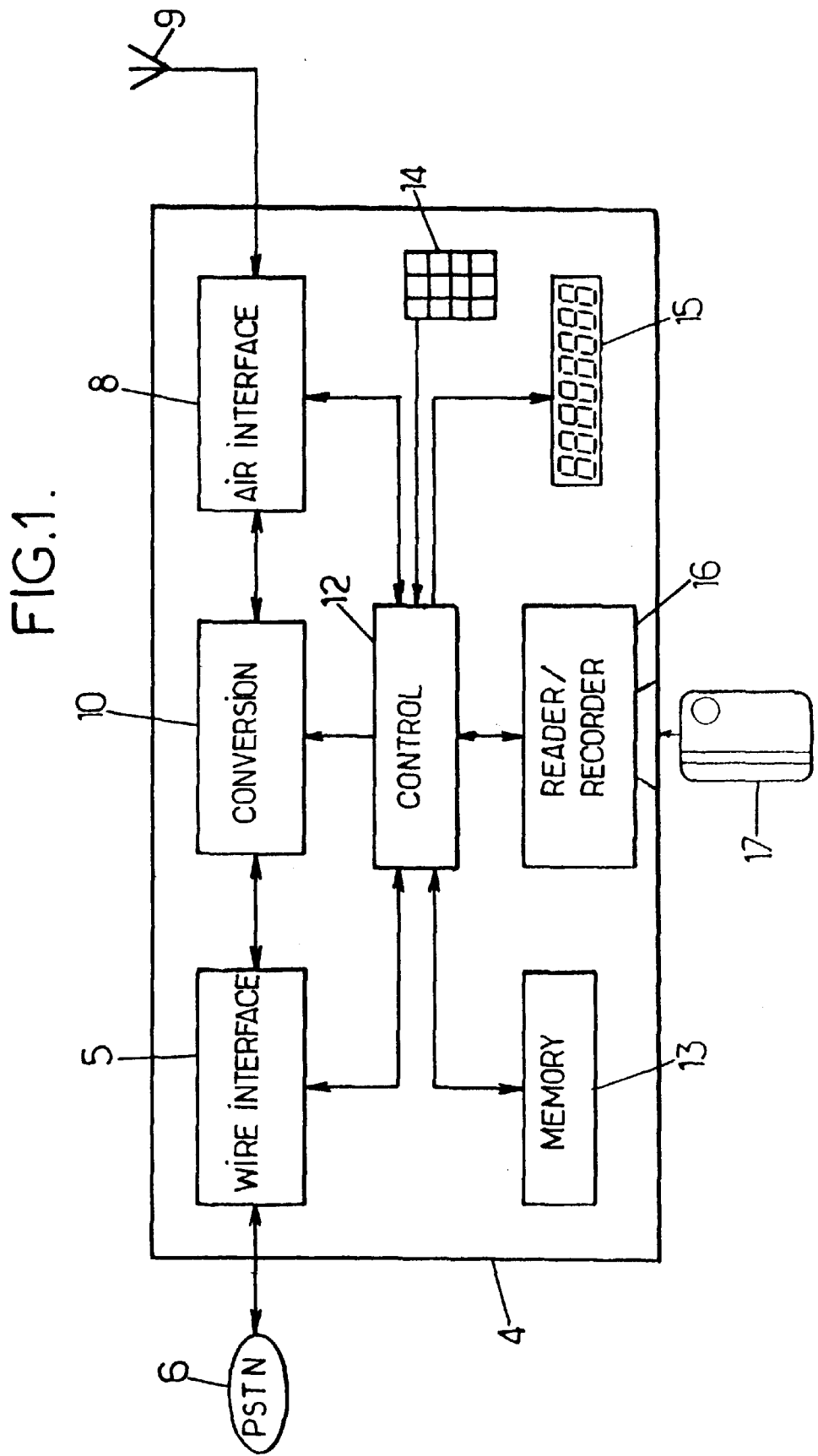
FIG. 1 is a block diagram of an equipment as proposed by the invention.

FIG. 1 illustrates a telephone equipment 4 consisting of a private base station for a subscriber to a cellular telephone network. This station is installed in the home of the subscriber or more generally in an area in which he wishes to obtain private radio coverage.

The equipment 4 has a wire interface 5 to be connected to a wire-line telecommunication network 6, such as an analogue switched telephone network, for example. The interface 5 operates in a conventional manner using the protocols of the wire-line network 6.

The equipment 4 also has an air interface 8 connected to the transmitting/receiving antenna 9. The radio range of the equipment is typically that of a conventional cordless telephone (less than 300 meters).

In the specific example described here by way of illustration, the air interface 8 operates in accordance with the European GSM radiotelephone system used in numerous cellular networks.

In particular, the interface 8 forms a broadcast common channel (BCCH) at a certain beacon transmission frequency. This frequency may be assigned to the equipment by the local network operator or it may be determined by the equipment automatically from a band of frequencies allocated to the network. In order to do this, the interface 8 may listen in to the frequencies in the allocated band and select the one on which the detected power is the lowest, so as to minimise interference.

The private base station 4 transmits a beacon signal on the BCCH channel, which provides, in particular, a cellular network identification code. This code usually enables the mobile stations to distinguish between different networks of the same type (GSM in our case) which may co-exist in certain areas. In our application, this code, referred to as PLMNC, identifies a private network made up of a single cell corresponding to the coverage provided by the equipment 4.

The mobile stations operating with the equipment 4 are adapted to access this private network in preference to other networks of the same type.

Such adaptation can be simply made through an automatic network selection mechanism such as that described in the standard GSM 03.22: <European digital cellular telecommunications system (Phase 2); Functions related to Mobile Station (MS) in idle mode>, European Telecommunications Standards Institute, Sophia Antipolis, France, November 1994, ETS 300 535. When a mobile station previously registered with the equipment 4 is switched on, this station looks for the private network corresponding to this equipment If this private network cannot be found (i.e. the mobile station is out of range of the equipment 4), the mobile station then tries to access its home cellular network (home PLMN) or another cellular network. If a mobile station is serviced by its home cellular network, it will check periodically to ascertain whether it can detect the presence of the beacon signal of the equipment 4. If this signal is detected, the mobile station attempts to access the private network. If this signal is lost, the mobile station issues a location update request to its home cellular network.

GSM mobile stations operate in conjunction with a plug-in subscriber identity module (SIM card) which carries all the data specific to the subscription. In particular, this module stores the international mobile subscriber identity (IMSI) as well as the associated individual authentication key $K_i$.

The equipment 4 illustrated in FIG. 1 has a conversion unit 10 between the interfaces 5 and 8. This unit 10 performs the various analogue-to-digital or digital-to-analogue conversions, speech coding/decoding and shaping of the signal frames required to make the interfaces 5 and 8 communicate. A control unit 12 intercepts the signalling messages received on the interfaces 5 and 8 and controls these interfaces 5, 8 and the conversion unit 10 as appropriate.

The control unit 12 is connected to a memory 13 as well as a user interface comprising a keyboard 14 and a display screen 15, for example. It is also connected to a data reader/recorder 16 provided for receiving a SIM card 17.

The reader/recorder 16 is used to exchange certain parameters with the SIM card 17 as part of a subscriber registration procedure with the equipment 4. Certain parameters, in particular the mobile subscriber identity IMSI, are read from the SIM card and stored in the memory 13, whilst other parameters, in particular the PLMNC network card assigned to the equipment 4, are written to an available memory zone of the SIM card 17.

In order to assign certain parameters to the private base station 4, the reader/recorder 16 may be set up to receive another plug-in data medium, referred to as a customisation card or module, containing parameters that will be indicated below. This customisation module has the same format as a SIM card. It has a storage zone, e.g. magnetic, but it is not necessarily a chip card.

Figure 2:
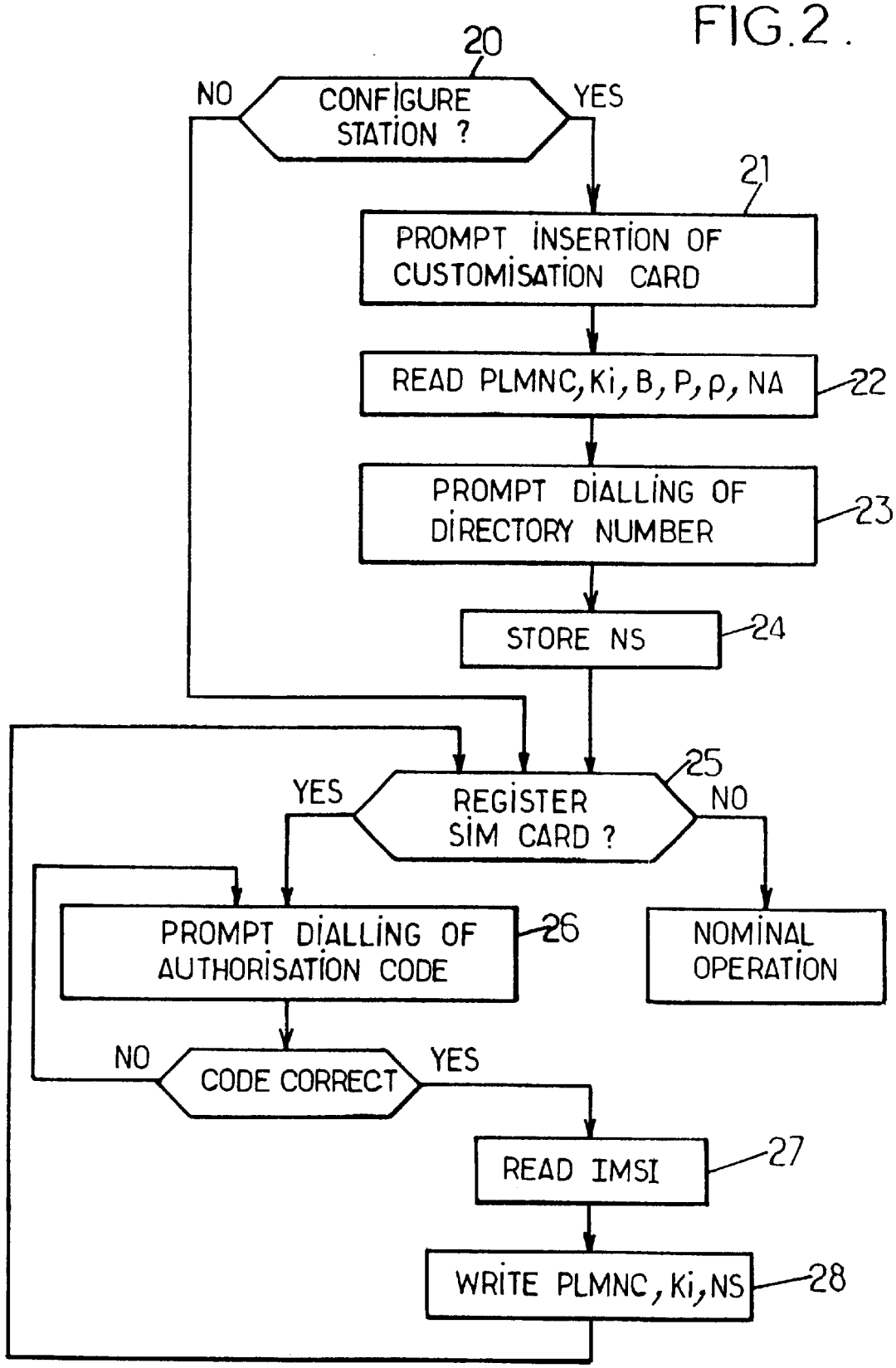
FIG. 2 is a flow chart illustrating a procedure by which the equipment is configured.

FIG. 2 illustrates one example of how the private base station 4 and a SIM card may be configured.

In an initial step, the control unit 12 determines whether the station 4 needs to be configured (step 20). This is the case for example when the base station 4 is switched on or in response to a configure command entered by the user from the keyboard 14. In this case, the user is prompted to insert his customisation card in the reader/recorder 16, by a message issued on the display screen 15 (step 21). Once this customisation card has been inserted in the reader 16, the control unit 12 issues a command for the following parameters stored on this card to be read and then written to the memory 13 (step 22):

network code PLMNC allocated to the private base station 4;

private authentication key $K_i$ specifically assigned to the authentication and encryption operations performed within the private network an indication B of the frequency band used for the radio signals within the private network;

authorised transmission power P for the air interface air for mobile signals within the private network, in particular for the beacon signal;

duty cycle $\rho$ for transmission of the beacon signal on the BCCH channel; since the GSM system is of the time division multiple access (TDMA) type, each TDMA frame being sub-divided into N=8 successive timeslots which may be assigned to different transmissions/receptions, and since the private network does not have another cell to be monitored by the mobile stations, the beacon signal may be transmitted during n timeslots over N ($1 \leq n \leq N$), which gives p=n/N secret authorisation code NA for registering a subscriber identity module with the private base station 4.

These parameters carried by the customisation card are defined by the operator of the subscriber's home network in accordance with the architecture and characteristics of this network.

Alternatively, rather than reading the values of these parameters from a plug-in customisation card, the control unit 12 could obtain them via the interface 5 by running a downloading programme which would query a server connected to the wire-line network 6 and controlled by the operator of the cellular network, in which the parameters in question would be stored.

At step 23, the user is prompted to enter from the keyboard 14 the directory number of the line of the wire-line network 6 to which the equipment is connected. Once entered and validated, this number is recorded in the memory 13 at step 24.

The holder of the private base station might also be able to choose the secret authorisation code NA, which would then be entered from the keyboard 14 rather than being read from a customisation card or downloaded.

Once the station 4 is configured, the control unit 12 determines, at step 25, whether a SIM card has been inserted in the reader 16 and needs to be registered with the private base station 4, for example if the user has entered a command to register from the keyboard 14. The first step 26 of this registration procedure consists in prompting the user to enter the registration authorisation code NA. If the user enters the correct code from the keyboard 14, the control unit 12 issues a command to read the mobile subscriber identity IMSI in the memory of the card 17 and write this identity to its memory 13 (step 27). At step 28, it then issues a command to write the parameters PLMNC and $K_i$ obtained at step 22 as well as the directory number NS to a zone provided in the memory of the SIM card 17.

Several SIM cards may be registered with the base station 4 in this manner.

Once this registration has been completed, the private base station 4 switches to its nominal operating mode.

In particular, it takes account of the parameters B, P, ρ obtained at step 22 of the configuration, transmitting the beacon signal at the maximum power P and the duty cycle ρ on a channel of the BCCH type, whose frequency is selected from the band B in the manner described above. The SIM card 17 is removed from the reader 16 and re-inserted in that of the mobile station. When switched on, the latter will initialise, giving priority to the private network.

If the private base station 4 detects an access request from a mobile station (random access channel RACH), it establishes a signalling channel and obtains from the mobile its identity IMSI. It then checks that this IMSI is in fact registered in its memory 13. This check avoids any problems of conflict between two neighbouring private base stations which would have the same network code PLMNC.

If the check is negative, the mobile station is denied access to the private network. Otherwise, the equipment 4 proceeds with authentication of the mobile station in a manner similar to that specified in the GSM standard but using the private key $K_i$. It generates a random number R which it communicates to the mobile station and computes another key S as a function of R and $K_i$ by applying a confidential algorithm. The mobile station receiving the number R proceeds with the same computation using the key $K_i$ which was stored in the SIM card at step 28 and returns the computed result S to the station 4. If the key S computed by the station 4 matches, access is authorised.

Once access has been authorised, the mobile station automatically activates in its home location register (HLR) of the cellular network a call forwarding service to the directory number NS which was registered in the SIM card. Accordingly, any call destined for the mobile subscriber will be routed through the equipment 4 via its connecting line to the wire-line network 6. Alternatively, the call forwarding service could be activated by the private base station 4 via the wire-line network 6 and an appropriate interface between the latter and the HLR.

When setting up a call involving the mobile station (outgoing or incoming), the latter computes an encryption key using the secret key $K_i$, a random number and another confidential algorithm. The same encryption key is computed by the station 4 and used to encrypt the mobile communications. The call then proceeds as a call from the wire-line network via the interfaces 5 and 8 and the conversion unit 10, the mobile station being used in a similar manner to that of a cordless telephone.

If the mobile station loses the mobile link to the equipment 4, it will automatically run a location update procedure with its home network. This mobile station or the base station 4 will also issue a command to deactivate the call forwarding service.

It may be noted that an automatic transfer (handover) between the private base station and a base station of the cellular network is impossible. However, the system may be arranged so that the air interface 8 supports an automatic intra-cellular transfer mechanism.

On the other hand, the air interface 8 may implement other mechanisms provided in the cellular system, such as frequency hopping, for example.

In general, it is advantageous if the duty cycle p for transmission of the beacon signal is equal to 1/N, in order to limit interference with the base stations of the cellular network and the other private stations, this ratio p not necessarily being programmable. The BCCH channel carrying the beacon signal will then occupy one timeslot out of N=8 in the TDMA frames. This timeslot may be selected by the private base station, like the beacon frequency, by means of a listening-in procedure in order to minimise interference with the radio environment.

During a call involving a mobile station through the wire-line network 6, the unit 12 controls the air interface 8 in order to interrupt the transmission of the beacon signal.

In particular, the interface 8 may allocate to the downlink radio transmission the physical channel previously occupied by the beacon signal, i.e. the TDMA timeslot allocated to the BCCH on the beacon frequency.

Every other mobile station whose SIM card has been registered and which is within range of the station 4 will then lose detection of the beacon signal and will spontaneously locate with its home cellular network so that it remains perfectly capable of communicating via the cellular network even though the wire-line is engaged. Once the call is terminated, the beacon signal is re-established and this other station, if still within range of the equipment, will try to access the private network again.

What is claimed is:

1. Telephone equipment comprising:
    a wire interface for connection to a wire-line telecommunication network;
    an air interface for communicating by radio with mobile stations in accordance with an operating mode of one type of cellular network, each mobile station operating in conjunction with a plug-in subscriber identity module containing parameters specific to the subscriber holding the mobile station and used to set up and/or operate radio calls; and
    a data reader/recorder capable of receiving a subscriber identity module, reading therefrom at least one of the parameters specific to the subscriber and writing thereto other parameters dependent on the equipment, whereby telephone calls involving a mobile station located within range of the equipment and associated with an identity module that was previously inserted in the data reader/recorder can be set up via the wire-line network by means of the wire interface and the air interface.

2. Equipment according to claim 1, wherein the parameters specific to the subscriber read in the identity module inserted in the reader/recorder comprise a mobile subscriber identity.

3. Equipment according to claim 1, wherein the parameters dependent on the equipment written to the identity module inserted in the reader/recorder comprise a key for authenticating the mobile station and/or encrypting radio communications.

4. Equipment according to claim 1, wherein the parameters dependent on the equipment written to the identity module inserted in the reader/recorder comprise a network identity code, a mobile station associated with said identification module being arranged to access a private network consisting of the equipment, to which said network identity code is assigned, in preference to other cellular networks.

5. Equipment according to claim 1, wherein the reader/recorder is further arranged to receive a customisation module and read therefrom at least part of the parameters dependent on the equipment which are then written to an identity module inserted in the reader/recorder.

6. Equipment according to claim 5, wherein the reader/recorder (16) is arranged to read additional parameters in the customisation module.

7. Equipment according to claim 6, wherein said additional parameters include a secret authorisation code for registering a subscriber identity module, the dialling of which is requested subsequently in order to authorise read and write operations in a memory of a subscriber identity module inserted in the reader/recorder.

8. Equipment according to claim 6, wherein said additional parameters include an indication of an authorised frequency band for the air interface.

9. Equipment according to claim 6, wherein said additional parameters include an authorised transmission power for the air interface.

10. Equipment according to claim 6, wherein said additional parameters include a duty cycle for transmission of a beacon signal by the air interface.

11. Equipment according to claim 1, further comprising downloading means for obtaining, from a server connected to the wire-line network, at least part of the parameters dependent on the equipment which are then written to an identity module inserted in the reader/recorder.

12. Equipment according to claim 11, wherein the downloading means are arranged to obtain additional parameters from the server.

13. Equipment according to claim 12, wherein said additional parameters include a secret authorisation code for registering a subscriber identity module, the dialling of which is requested subsequently in order to authorise read and write operations in a memory of a subscriber identity module inserted in the reader/recorder.

14. Equipment according to claim 12, wherein said additional parameters include an indication of an authorised frequency band for the air interface.

15. Equipment according to claim 12, wherein said additional parameters include an authorised transmission power (P) for the air interface.

16. Equipment according to claim 12, wherein said additional parameters include a duty cycle for transmission of a beacon signal by the air interface.

17. Equipment according to claim 1, wherein the air interface is arranged to transmit a beacon signal in accordance with the operating mode of said type of cellular network, so that it can be detected by a mobile station located within radio range of the equipment and to cease transmitting the beacon signal during a call set up via the wire-line network and involving a mobile station.

18. Equipment according to claim 17, wherein the air interface is arranged to occupy the physical channel of the beacon signal during the call using said mobile station.

19. Equipment according to claim 17, wherein said type of cellular network uses time division multiple access, with signal frames each divided into several successive timeslots and wherein the air interface transmits the beacon signal during one timeslot per frame on a beacon frequency and does not transmit a signal during the other timeslots on the beacon frequency.

* * * * *